United States Patent [19]

Hisakado et al.

[11] Patent Number: 5,406,534
[45] Date of Patent: Apr. 11, 1995

[54] DOUBLE-SIDED RECORDABLE OPTICAL DISK SUITABLE FOR A SUBSTITUTING PROCESS AND A METHOD FOR PERFORMING DEFECT MANAGEMENT

[75] Inventors: Yuji Hisakado; Isao Satoh, both of Neyagawa; Yuji Takagi, Hirakata; Motoshi Ito, Moriguchi, all of Japan

[73] Assignee: Matsushita Electric Industrial Co., Ltd., Osaka, Japan

[21] Appl. No.: 191,369

[22] Filed: Feb. 3, 1994

[30] Foreign Application Priority Data

Feb. 3, 1993 [JP] Japan .................................. 5-016113

[51] Int. Cl.⁶ .......................... G11B 17/22; G11B 7/00
[52] U.S. Cl. ........................................ 369/32; 369/47; 369/44.37
[58] Field of Search .................. 369/32, 44.37, 47, 50, 369/54, 100, 109, 116, 13, 14, 44.26, 44.11, 110, 112, 275.1, 275.3, 44.28, 44.29; 360/114, 59, 77.05, 78.14, 72.2, 77.04

[56] References Cited

U.S. PATENT DOCUMENTS 5,132,953 7/1992 Matsubayashi .................... 369/44.37
5,253,242 10/1993 Satoh et al. ............................ 369/47

FOREIGN PATENT DOCUMENTS 4-335212 11/1992 Japan .

OTHER PUBLICATIONS

M. Onoue et al., *Optical Disk Technique*, pp. 230–233, Feb. 10, 1989, "1.8.4. Alternative Area" with partial English translation.

*Primary Examiner*—Robert J. Pascal
*Assistant Examiner*—Ali Neyzari
*Attorney, Agent, or Firm*—Ratner & Prestia

[57] ABSTRACT

An optical disk apparatus for an optical disk having two sides for which data can be simultaneously recorded. Each of the two sides includes a spare area for alternative recording. In the optical disk apparatus, a series of data to be recorded is distributed into first data for the first one of the two sides and second data for the second one of the two sides. The apparatus of this invention detects any defective sector into which data cannot be recorded which occurs in either one or both sides during the simultaneous recording. If there is a defective sector in one side, an alternative recording process is performed for alternatively recording data that was to be recorded into the detected defective sector, and data to be recorded into a sector in the other side corresponding to the defective sector, into alternative sectors in the spare areas of the two sides, respectively. Also, defect information relating to the defective sector is recorded into a predetermined area of the optical disk. When the first data and the second data are reproduced, the first and second data are integrated and rearranged, so as to reproduce the series of data.

17 Claims, 8 Drawing Sheets

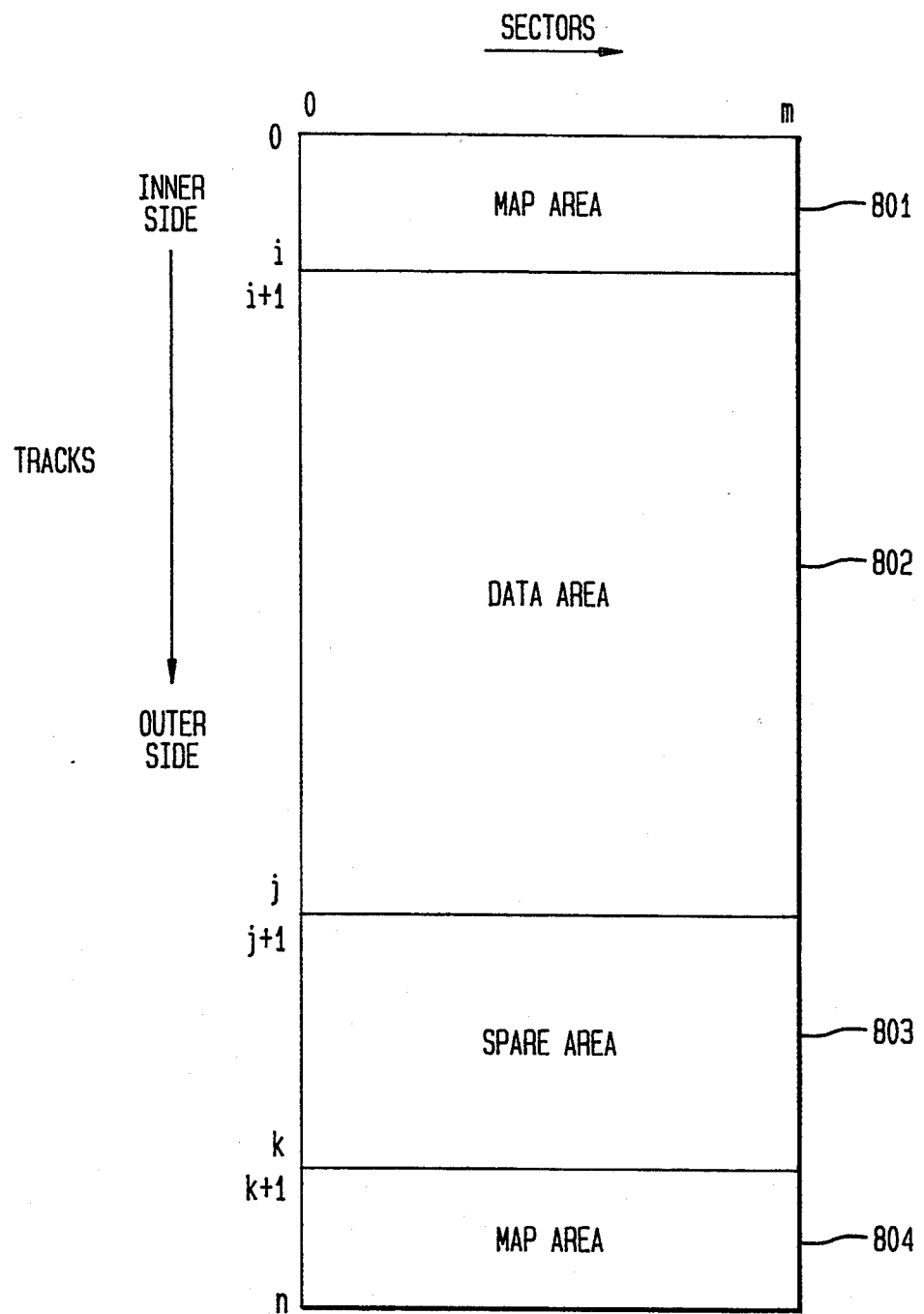

DOUBLE-SIDED RECORDABLE OPTICAL DISK SUITABLE FOR A SUBSTITUTING PROCESS AND A METHOD FOR PERFORMING DEFECT MANAGEMENT

BACKGROUND OF THE INVENTION

1. Field of the Invention

The present invention relates to an optical disk apparatus and a recording/reproducing method used in the apparatus, and more particularly to a substituting process for a double-sided recordable optical disk.

2. Description of the Related Art

A format of an optical disk is first described. FIG. 8 shows an exemplary format of an optical disk including a spare area. In FIG. 8, the downward direction indicates the direction from an inner side to an outer side of the tracks, and the transverse direction indicates the direction in which sectors are arranged.

As is shown in the figure, an area from the (0)th track to the (i)th track is a map area 801 for recording information on the substituting process. The area from the (i+1)th track to the (j)th track is a data area 802 for recording the usual recording data. The area from the (j+1)th track to the (k)th track is a spare area 803 in which, if the data area 802 includes any defective sectors, alternative sectors which alternatively record information to the defective sectors are located. An area from the (k+1)th track to the (n)th track is map area 804.

When data is to be recorded on a rewrite optical disk, a laser beam irradiation is performed for one and the same sector usually twice or three times. In the case of an optical disk capable of overwriting, the first irradiation is performed for retrieving a target address in the data area 802 and for recording the data into the target sector. The second irradiation is performed for reading out the data recorded at the target address in order to verify the recorded data. In the case of an optical disk which is not capable of overwriting, a laser beam irradiation for erasing the target address is performed before the data is recorded.

When any recording error occurs during this recording operation, e.g., when an error occurs in the verification, or when data is not properly recorded because any abnormality such as a track jump error or an address read error occurs in the recording, the target sector to which data is recorded is treated as a defective sector, and a substituting process for recording the data into the alternative sector in the spare area 803 is performed. In the case where such a substituting process is performed, a flag indicating that the sector is a defective sector is written into that defective sector. Then, information specifying the alternative sector to which data is recorded alternatively to the defective sector is recorded in the map area 801. As is shown in FIG. 8, the map areas 801 and 804 are usually located at a plurality of positions in the most inner periphery and in the most outer periphery of the optical disk. In order to enhance the reliability, the same information is multi-recorded. When the data for which the substituting process is performed is to be reproduced, the information on the substituting process recorded in the map area 801 is first read out, so that the CPU recognizes the address of the alternative sector in which the data is actually recorded. Then, the retrieval order is grasped and an optical head is controlled so as to read out the data.

Now assuming the case where, in an optical disk apparatus capable of recording or reproducing data simultaneously for both sides by using a double-sided recordable optical disk, and having a structure in which optical head moving systems for both sides cooperatively operate in the radius direction of the optical disk, and a defective sector exists in either one side of the double-sided recordable optical disk in the recording, and the substituting process of the defective sector is performed for only one side. When the recorded data that is to be reproduced and hence the alternative sector for which the substituting process is performed is to be read out, the optical head for the other side on which the substituting process is not performed is also positioned in the alternative area. Accordingly, it is necessary for a user to wait for a period in which the reading operation is interrupted on the side for which the substituting process is not performed. As a result, the data reproducing process time is disadvantageously increased.

SUMMARY OF THE INVENTION

The optical disk apparatus of this invention is used for an optical disk having two sides for which data can be simultaneously recorded, and each of the two sides includes a spare area for alternative recording. The optical disk apparatus includes: means for distributing a series of data to be recorded, into first data to be recorded on a first one of the two sides and second data to be recorded on a second one of the two sides; first recording/reproducing means for recording and reproducing the first data onto and from the first side; second recording/reproducing means for recording and reproducing the second data onto and from the second side; detecting means for detecting any defective sector into which data cannot be recorded which occurs in either one or both of the two sides during the simultaneous recording for the two sides; control means for controlling the first recording/reproducing means and the second recording/reproducing means so as to perform an alternative recording process of alternatively recording data to be recorded into the detected defective sector in one of the two sides, and data to be recorded into a sector in the other one of the two sides corresponding to the defective sector, into alternative sectors in the spare areas of the two sides, respectively, and so as to record defect information relating to the defective sector into a predetermined area of the optical disk; and data integrating means for integrating the first data reproduced by the first recording/reproducing means with the second data reproduced by the second recording/reproducing means, and rearranging the first and second data, thereby producing the series of data.

According to another aspect of the invention, there is provided a method for performing a defect management of an optical disk when a series of data is to be recorded and reproduced, the optical disk having two sides for which data can be simultaneously recorded, and each of the two sides includes a spare area for alternative recording. In the method, a recording step includes the steps of: distributing a series of data to be recorded, into first data to be recorded on a first one of the two sides and second data to be recorded on a second one of the two sides; simultaneously recording the first data onto the first side, and the second data onto the second side; detecting any defective sector into which data cannot be recorded which occurs in either one or both of the two sides during the simultaneous recording for the two sides; performing an alternative recording process of alternatively recording data to be recorded into the detected defective sector in one of the two sides, and data to be recorded into a sector in the other one of the two sides corresponding to the defective sector, into alternative sectors in the spare areas of the two sides, respectively; and recording defect information relating to the defective sector into a predetermined area of the optical disk. In the method, a reproducing step includes the steps of: reproducing the first data from the first side, and the second data from the second side; and integrating and rearranging the reproduced first data and the reproduced second data, thereby producing the series of data.

According to the invention, in the case where any recording error occurs due to a defective sector in either one of the two sides of a double-sided recordable optical disk during the double-side simultaneous recording, the substituting process is unconditionally performed for both sides, even when the recording sector on the other side is the correct one. Thus, the data to be written on the side is recorded into the alternative sector. When the data is to be reproduced, the data recorded in the alternative sectors on both sides are accessed.

According to the above-described method, in the substituting process of a defective sector in the optical disk apparatus having a double-side head portion for performing recording or reproducing data simultaneously for both sides of the double-side optical disk, the process waiting time for the data reading of the alternative sector can be eliminated, and the process time can be minimized.

Thus, the invention described herein makes possible the advantage of providing an optical disk apparatus capable of recording or reproducing data simultaneously for both sides and a recording/reproducing method used in the apparatus, in which, when alternative recording of a defective sector is performed in the double-sided recordable optical disk, the reading process time during the data reproduction is shortened.

This and other advantages of the present invention will become apparent to those skilled in the art upon reading and understanding the following detailed description with reference to the accompanying figures.

BRIEF DESCRIPTION OF THE DRAWINGS

FIG. 8 is a schematic diagram representing alternative areas of an optical disk.

DESCRIPTION OF THE PREFERRED EMBODIMENTS

Hereinafter, the present invention will be described by way of illustrative examples with reference to the accompanying drawings.

EXAMPLE 1

Figure 1:
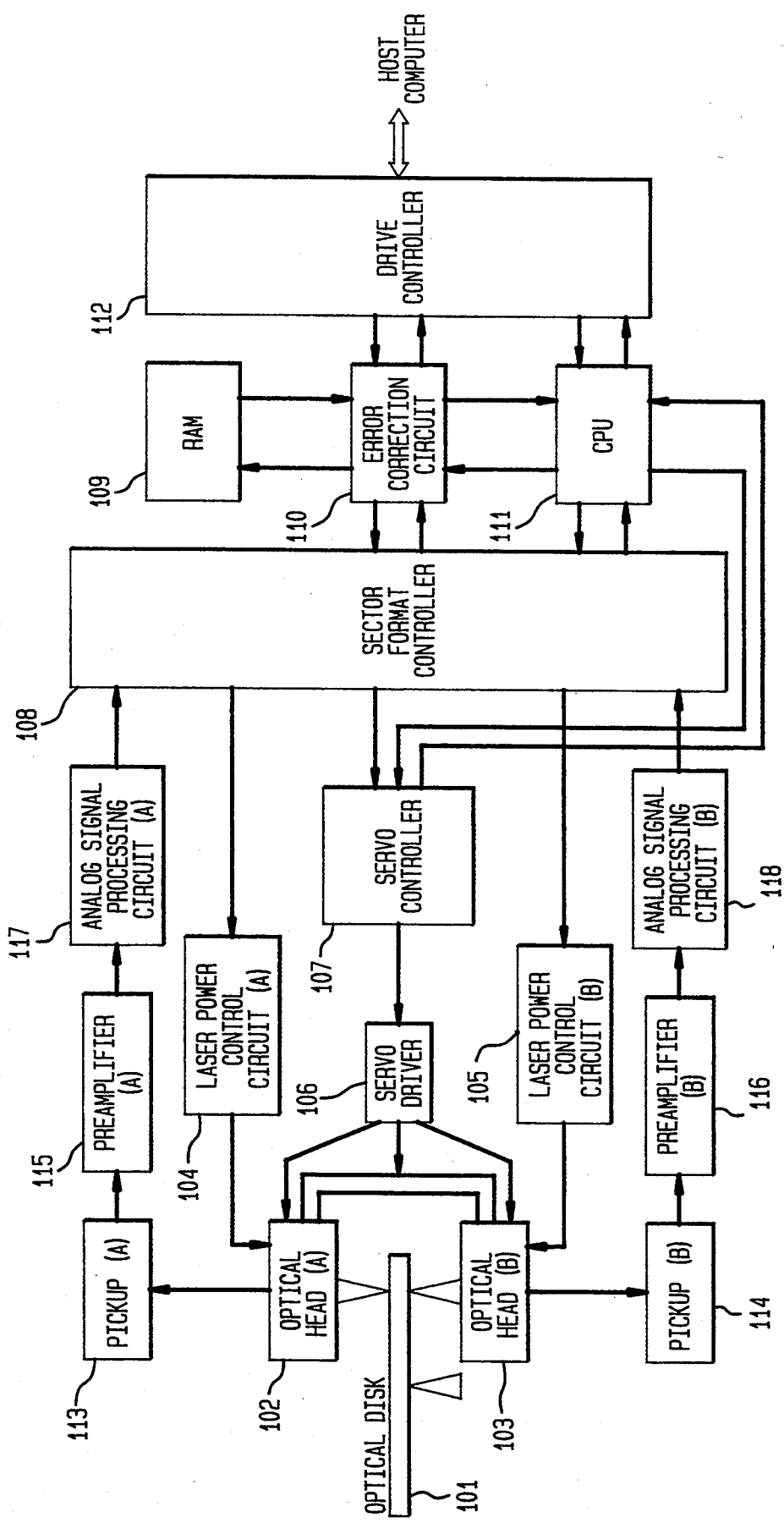
FIG. 1 is a block diagram showing a circuit configuration of an optical disk apparatus in Example 1.

FIG. 1 is a block diagram showing a simple circuit configuration of an optical disk apparatus having a double-side optical head portion in Example 1 according to the invention. Referring to FIG. 1, the construction of the optical disk apparatus in this example is described.

The optical disk apparatus is used for a double-sided recordable optical disk 101, and includes an optical head (A) 102, an optical head (B) 103, a laser power control circuit (A) 104, a laser power control circuit (B) 105, a servo driver 106, and a servo controller 107. The optical head (A) 102 performs the recording and reproducing for side-A of the optical disk 101. The optical head (B) 103 performs the recording and reproducing for side-B of the optical disk 101. The laser power control circuit (A) 104 controls the laser power of the optical head (A) 102. The laser power control circuit (B) 105 controls the laser power of the optical head (B) 103. The servo driver 106 drives an actuator of the optical head (A) 102, an actuator of the optical head (B) 103, and an optical head moving member. The optical head moving member cooperatively and simultaneously moves the optical head (A) 102 and the optical head (B) 103. The servo controller 107 controls the servo driver 106.

The optical disk apparatus further includes a pickup (A) 113, a pickup (B) 114, a preamplifier (A) 115, a preamplifier (B) 116, an analog signal processing circuit (A) 117, and an analog signal processing circuit (B) 118. The pickup (A) 113 picks up information from the side-A of the optical disk 101, and the pickup (B) 114 picks up information from the side-B of the optical disk 101. The preamplifier (A) 115 amplifies the signal picked up by the pickup (A) 113, and the analog signal processing circuit (A) 117 processes the analog signal from the preamplifier (A) 115 so as to digitize the analog signal. The preamplifier (B) 116 amplifies the signal picked up by the pickup (B) 114, and the analog signal processing circuit (B) 118 processes the analog signal from the preamplifier (B) 116 so as to digitize the analog signal.

The optical disk apparatus further includes a sector format controller 108, a random access memory (RAM) 109, an error correction circuit 110, a central processing unit (CPU) 111, and a drive controller 112. The sector format controller 108 reads out an address from the optical disk 101, modulates and demodulates data, and so on. The sector format controller 108 controls the laser power control circuit (A) 104, the laser power control circuit (B) 105, and the servo controller 107. The sector format controller 108 receives output signals from the analog signal processing circuit (A) 117 and the analog signal processing circuit (B) 118. The RAM 109 stores the recorded data and the read data. The error correction circuit 110 adds an error correction code to the recorded data, corrects the error in the read data, and so on. The CPU 111 controls the servo controller 107, the sector format controller 108, the error correction circuit 110, and the drive controller 112. The drive controller 112 controls the drive of the optical disk apparatus. The optical disk apparatus is connected to a host computer.

The flow of data in the optical disk apparatus having the above-described construction will be described with reference to FIG. 1.

In the recording, the data supplied from the host computer is sent to the error correction circuit 110. In the error correction circuit 110, an error correction code which is a redundant word for detecting an error such as a known Reed Solomon Code is added to the data. The data to which the error correction code is added is stored in the RAM-109 and also transmitted to the sector format controller 108. The data is converted into a signal suitable to be recorded on the optical disk 101, for example, subjected to a (2, 7) RLLC (run-length limited Codes) modulation, in the sector format controller 108. The signal is equally distributed to the laser power control circuit (A) 104 and the laser power control circuit (B) 105 by a length of bytes for one sector. By modulating the laser powers of the respective optical heads (A) 102 and (B) 103, so that the distributed data is recorded on the side-A and the side-B of the optical disk 101, respectively.

Next, the data is read out so as to judge whether the recorded data is correct or not, so as to verify the data. The verification is the judgment as to whether the data is properly recorded or not by comparing the recorded data stored in the RAM 109 with the reproduced data read out from the optical disk 101 and to which the error correction is performed. As the result of the verification, when the error correction cannot be performed for the read-out sector data, the sector is determined to be a defective sector.

The verification is described in detail. The data recorded on the side-A and the side-B of the optical disk 101 is read out by the pickup (A) 113 and the pickup (B) 114, respectively. The data read out from the side-A and the side-B are amplified by the preamplifier (A) 115 and the preamplifier (B) 116, respectively. Then, the amplified side-A and side-B data are digitized by the analog signal processing circuit (A) 117 and the analog signal processing circuit (B) 118, respectively, and sent to the sector format controller 108. The sector format controller 108 reads the address and the data, so as to demodulate the signal recorded on the optical disk 101 into NRZ (Non Return to Zero) data. Moreover, the demodulated side-A and side-B data are arranged and integrated into one unit of data. The unit of data is transmitted to the error correction circuit 110. The reproduced data sent to the error correction circuit 110 is compared with the recorded data stored in the RAM 109 in the recording. If the data match, the recording for next data is successively performed. If the data do not match, the data sector is determined to be a defective sector, so that the data is alternatively recorded into the alternative sector of the optical disk 101.

In this invention, if data is not properly recorded onto either side-A or side-B of the optical disk 101 due to a defective sector and the like, the substituting process is performed for both sides.

Figure 2:
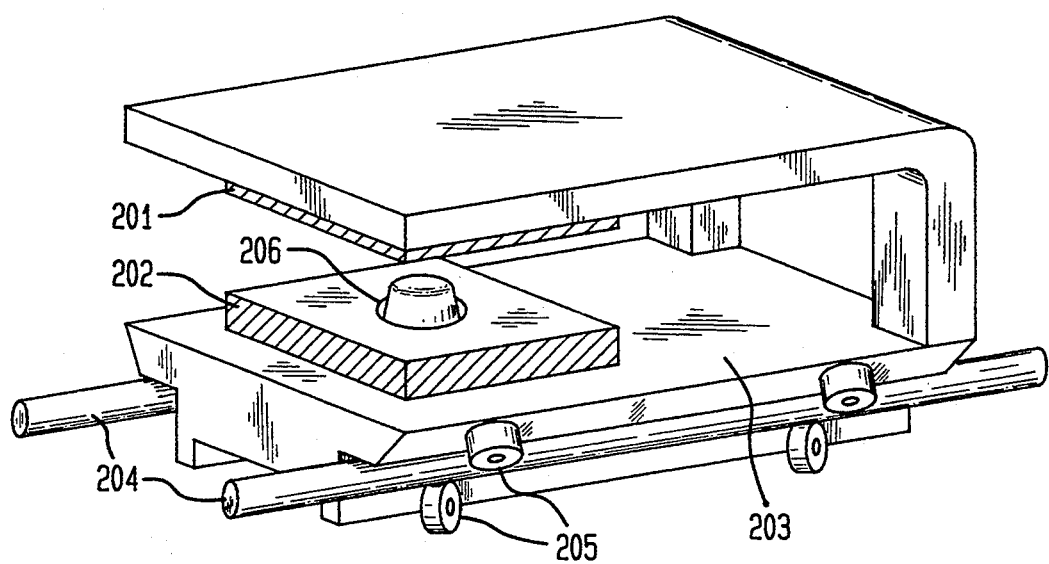
FIG. 2 is a simple perspective view showing a construction of a double-side optical head portion.

Next, the construction of double-side optical head portion of the optical disk apparatus in this example is described in detail with reference to FIG. 2. FIG. 2 is a simplified diagram showing the construction of the double-side optical head portion in this example.

As is shown in FIG. 2, the double-side optical head portion includes a pair of actuators 201 and 202, a moving member 203, guiding shafts 204, rollers 205, and a pair of objective lenses 206. On each of the actuators 201 and 202, the corresponding objective lens 206 and an operating unit therefor are mounted. A double-sided optical disk 101 is inserted between the actuators 201 and 202. Laser beams emitted from a semiconductor laser are converged on the optical disk 101 via the objective lens 206. The moving member 203 moves by means of the rollers 205 along the guiding shafts 204, so as to move the actuators 201 and 202 in the direction along the radius of the optical disk 101. The actuators 201 and 202 are fixed onto the moving member 203, so that they are cooperatively and simultaneously moved in the radius direction by the moving member 203. Specifically, in the retrieval operation, the actuators 201 and 202 are simultaneously moved in the same direction and by the same distance. The focusing and tracking control is independently performed for each of the actuators 201 and 202. Such independent focusing and tracking control for each side is effective for an optical disk with different track positions between the two sides thereof. That such different track positions may occur in an optical disk which will be described later, in which addresses on the side-A and addresses on the side-B are located at the same positions. The reason is that there may occur slight positional misalignments between the side-A and the side-B of the optical disk.

In the optical head portion, when a double-sided optical disk 101 is inserted between the actuators 201 and 202, one side of the optical disk 101 which faces the actuator 201 is recognized as the side-A, and the other side which faces the actuator 202 is recognized as the side-B. A spindle motor for rotating the optical disk 101 can bidirectionally rotate, i.e., in a clockwise direction or in a counter-clockwise direction, considering the possibility that the optical disk 101 is inserted in such a manner that the side-A and the side-B thereof are reversed.

Figure 3A:
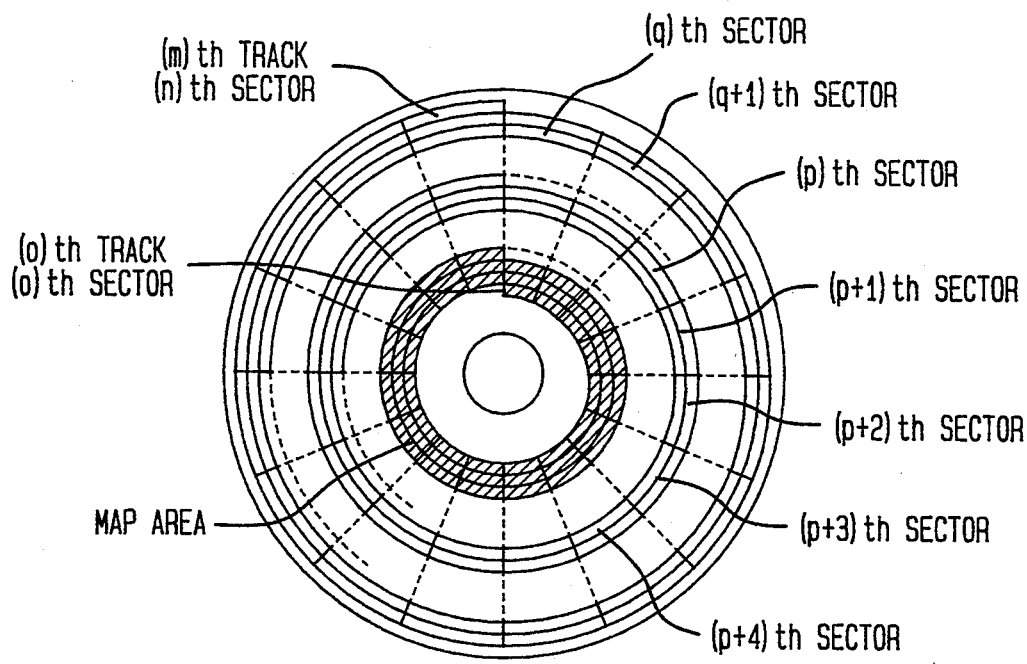
FIGS. 3A-3B are schematic diagram showing spiral forms of the double-sided optical disk.
Figure 3B:
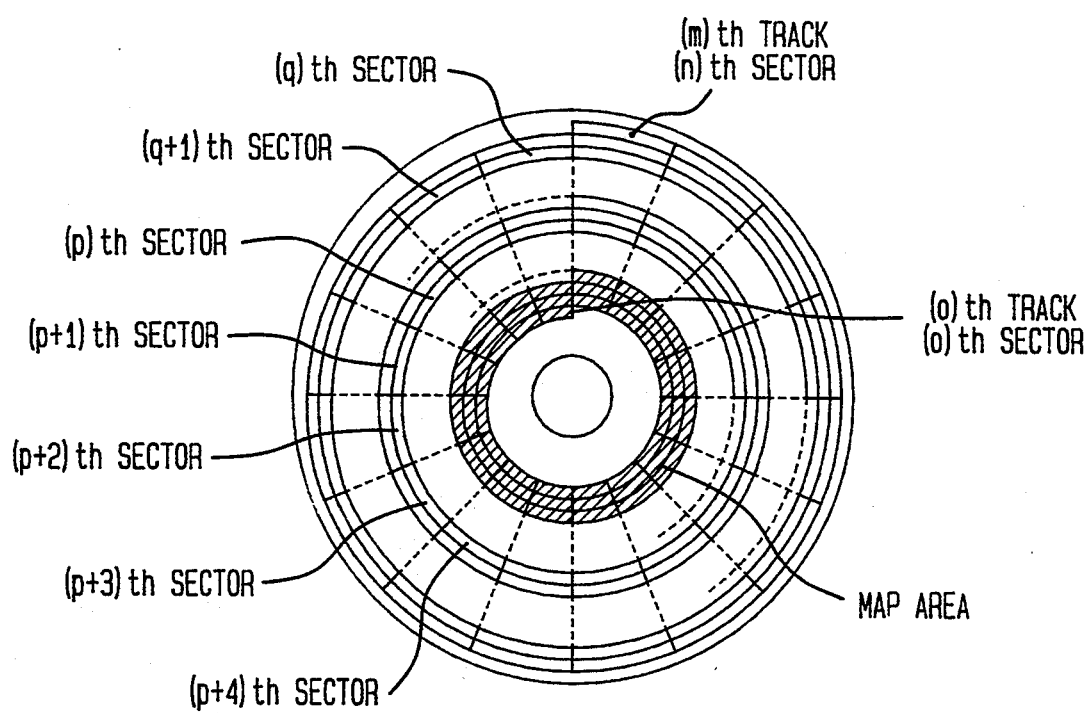

Next, a format of the double-sided optical disk according to the invention is described with reference to FIG. 3. FIG. 3 shows an exemplary schematic diagram of the side-A and the side-B of the double-sided optical disk.

As is shown in FIG. 3, side-A includes tracks formed in a spiral extending from the inner periphery in the clockwise direction. The most inner track of the optical disk is the (0)th track and the first sector is the (0)th sector. The most outer track of the optical disk is the (m)th track and the last sector is the (n)th sector. Side-B includes tracks formed in a spiral extending from the inner periphery in the counterclockwise direction. The other formats are completely identical with those of side-A. Side-A and side-B are attached to each other so that the corresponding addresses on the side-A and the side-B are located at physically the same positions. That is, when the simultaneous double-side access is to be performed, the target sectors on the respective sides always have the same address.

Figure 4:
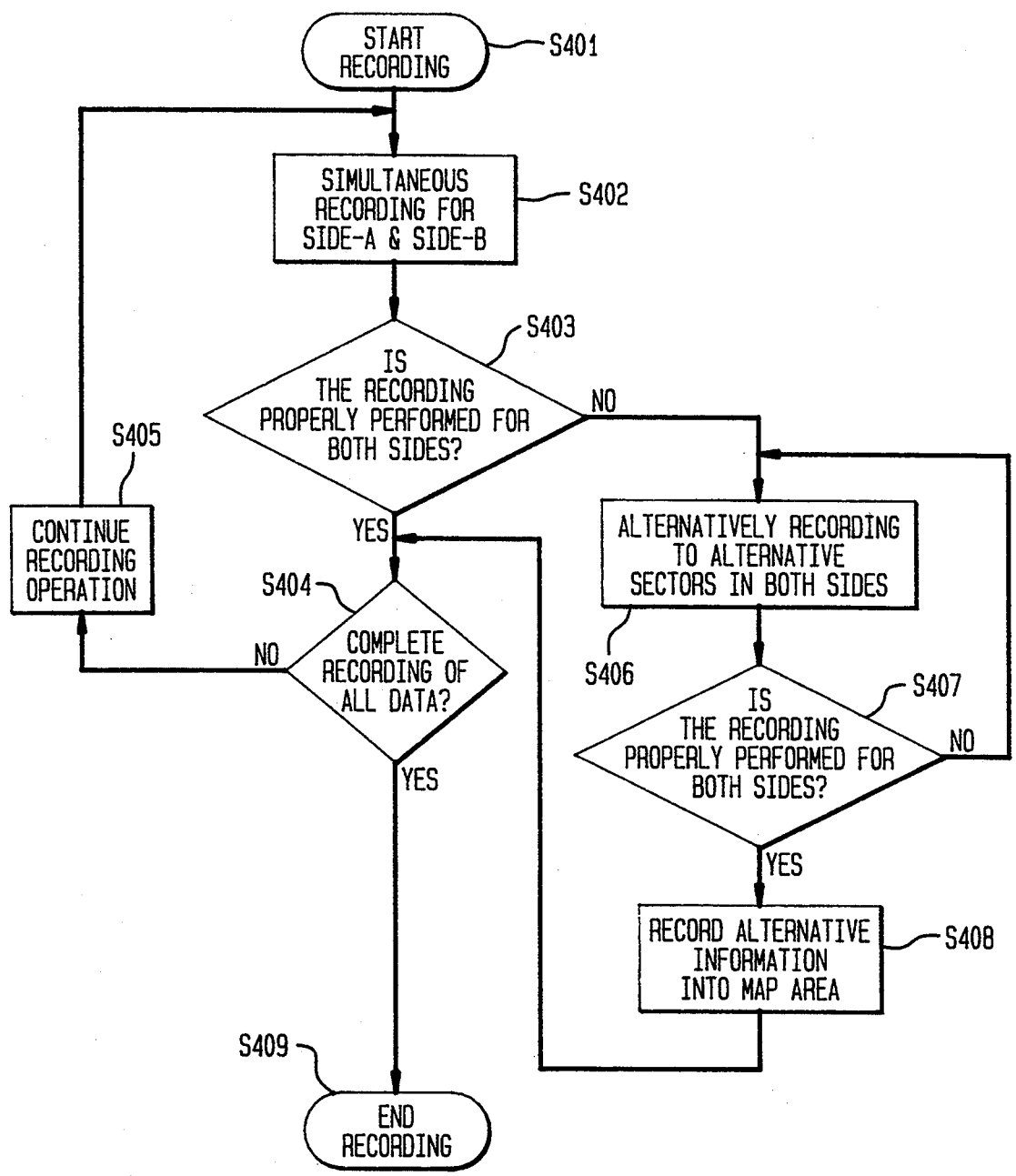
FIG. 4 is a flowchart illustrating the flow of the substituting process in the recording operation when data are recorded simultaneously on both sides of the disk.

Herein, for simplicity, the recording/reproducing operation will be described in an exemplary case where data of five sectors from the (p)th sector to the (p+4)th sector for each of the side-A and the side-B of the optical disk shown in FIG. 3, i.e., data of a total of ten sectors are simultaneously recorded on both sides, and the (p+2)th sector on the side-A is a defective sector. FIG. 4 is a flowchart illustrating an exemplary operation of the substituting process in this example.

With reference to FIGS. 2 and 4, when the recording operation is started at step S401, the data to be recorded to which the error correction code has been attached by the error correction circuit 110 is first stored in the RAM 109. At the same time, the data to be recorded is sent to the sector format controller 108, and equally distributed to the side-A and the side-B of the optical disk 101. Next, in step S402, the actuators 201 and 202 start to simultaneously record the data into the (p)th sector of side-A and into the (p)th sector of side-B of the optical disk 101, respectively.

When the recording up to the side-A (p+4)th sector and the side-B (p+4)th sector is completed, it is verified as to whether the data are properly recorded on both the side-A and side-B in step S403. That is, the following process is performed. First, the recorded data from the (p)th sector to the (p+4)th sector of side-A, and the recorded data from the (p)th sector to the (p+4)th sector of side-B are simultaneously read out. Then, under control of the CPU 111, it is confirmed whether the reproduced data match the data to be recorded which are stored in the RAM 109.

If it is detected in step S403 that, for example, the reproduced data from the side-A (p+2)th sector is not matched with the corresponding recorded data, the process proceeds to step S406 where a sequence of the substituting process is performed. The substituting process in step S406 is performed for both the (p+2)th sectors of side-A and side-B irrespective of the recording conditions of the side-B (p+2)th sector. First, under control of the CPU 111, a flag indicating a defective sector is written into both the side-A (p+2)th sector and the side-B (p+2)th sector. Then, an alternative sector for the alternative recording is specified. For example, a (q)th sector in the spare area is specified. Both the actuators 201 and 202 are simultaneously moved to the (q)th sectors of side-A and side-B. Thus, the data to be recorded into the side-A (p+2)th sector is alternatively recorded into the side-A (q)th sector and the data to be recorded into the side-B (p+2)th sector is alternatively recorded into the side-B (q)th sector in step S406. After the alternative recording process, it is also verified in step S407 whether the data are properly recorded in the side-A (q)th sector and in the side-B (q)th sector, the same as in the normal recording operation. If the recording is properly performed for both sides, the process proceeds to step S408. In step S408, the information of the substituting process (defect information) is recorded in each of the map areas of side-A and side-B. Accordingly, the defect information written in the map area of the side-A is the same as that written in the map area of the side-B. The defect information is specifically in the form of a table indicating physical addresses of defective sectors and address information on alternative sectors corresponding to the defective sectors. Therefore, the defect information recorded in the map area indicates the address of the defective sector (e.g., the side-A (p+2)th sector, the side-B (p+2)th sector) and the address of the alternative sector (e.g., the side-A (q)th sector, the side-B (q)th sector) in which the data that was to be recorded into the defective sector is alternatively recorded.

If it is judged in step S407 that data is not properly recorded in at least one of the side-A (q)th sector and the side-B (q)th sector, the process returns to step S406. In step S406, the same as in the foregoing case for the (p+2)th sectors, the data to be recorded into the side-A (q)th sector and the side-B (q)th sector are alternatively recorded, for example, in the side-A (q+1)th sector and the side-B (q+1)th sector, respectively. In this way, the alternative recording is repeatedly performed until the data are properly recorded on both of side-A and side-B. If the data are properly recorded on both of side-A and side-B, the process advances to the normal recording operation.

Thereafter, if it is judged in step S404 that there is other data to be recorded, the process proceeds to step S405 where the recording operation is continued. If it is judged in step S404 that there is no data more to be recorded, the process proceeds to step S409 where the process is terminated.

When the data which has been recorded on the optical disk 101 in accordance with the flow of the recording operation shown in FIG. 4 is to be reproduced, the information in the map area is read out so as to obtain the alternative information of the defective sectors. At this time, as in the conventional apparatus, it is assumed that the alternative recording is performed only for the side-A during the recording. The optical head (A) 102 and the optical head (B) 103 are cooperatively moved for the retrieval operation to the alternative sector, as described above. However, in such a case, the optical head (B) 103 should be in the waiting state during the reading operation for the alternative sector on the side-A. This results in the increase in the reproducing process time. In this example, since the data are recorded in the (q)th sectors alternative to the (p+2)th sectors on both sides, the reading operation is performed for the (q)th sectors on both sides. Thus, the reproducing process time due to the one-side waiting state can be minimized.

In cases where the alternative (defect) information is first read out from the map area, so as to perform the reproducing process, it is unnecessary to use such a flag indicating a defective sector. Such a flag indicating a defective sector is specifically used for detecting a defective sector in the case where the data is first read out from the data area. In such a case, after a defective sector is detected, information in the map area is read out, so as to recognize the alternative information for reading data from the alternative sector.

In addition, in this example, the data are read out in the normal sequence. In other words, every time when the data is to be read out from the defective sector, instead the data is read out from the alternative sector in which the data is recorded alternatively to the defective sector. Therefore, it is unnecessary to rearrange the data read out from the respective sectors into the correct order in the sector format controller 108. Thus, it is possible to simplify the construction of the sector format controller 108. In addition, the reproducing process time in the sector format controller 108 can be shortened.

In this example, the optical heads and the actuators for which the cooperative moving system is provided, the format of the double-sided optical disk, data distribution, the reproducing method, and the like are exemplarily described. It is appreciated that this invention is applicable to a separate type optical head for each side, an optical disk in which the positions of tracks and sectors on two sides are physically shifted from each other, or other different data schemes.

EXAMPLE 2

Figure 5:
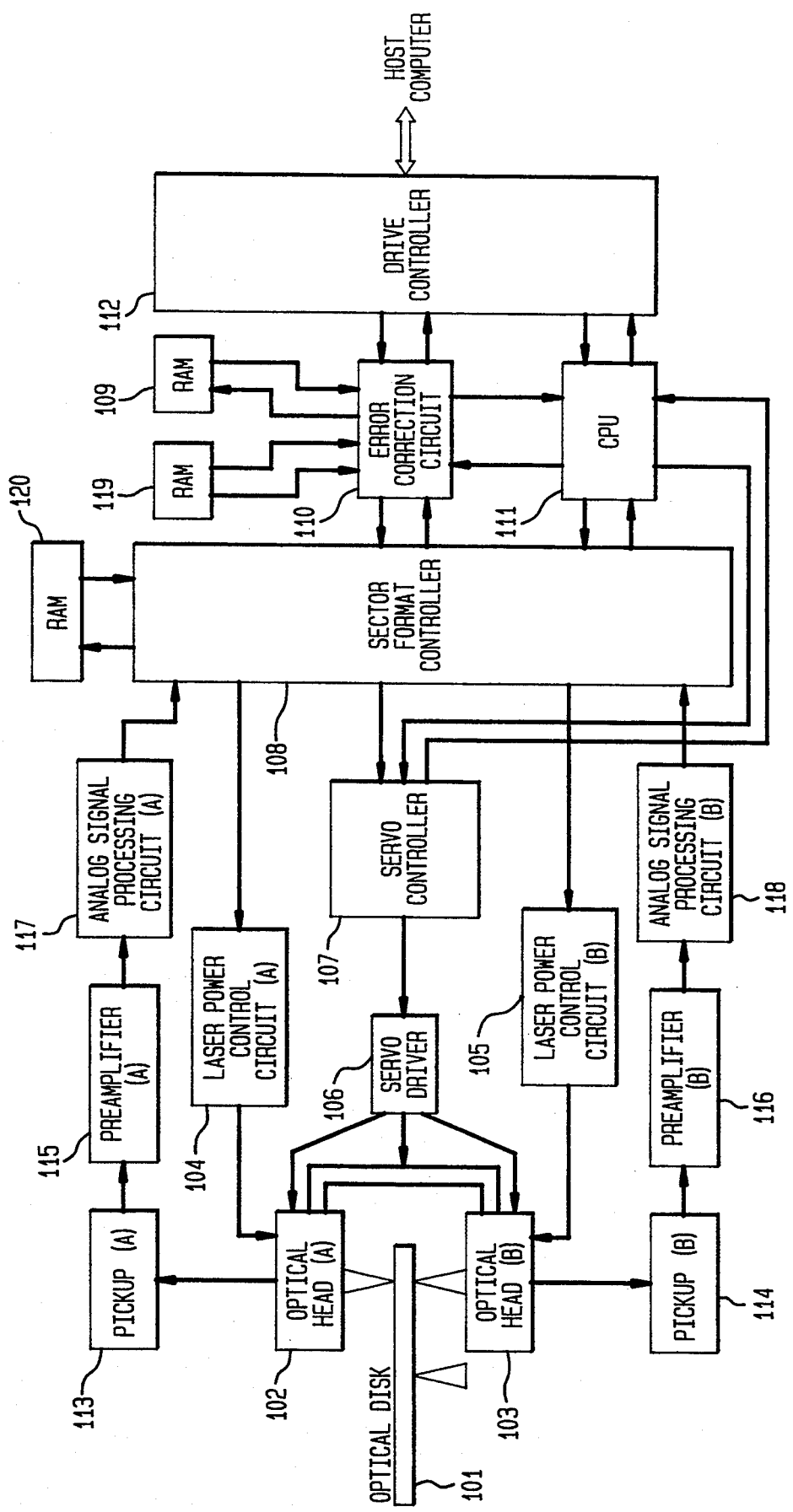
FIG. 5 is a block diagram showing a circuit configuration of an optical disk apparatus in Example 2.

An optical disk apparatus in a second example of the invention will be described with reference to FIG. 5. FIG. 5 is a block diagram showing the construction of the optical disk apparatus in this example. In FIG. 5, identical components to those of the optical disk apparatus in the first example shown in FIG. 1 are indicated by identical reference numerals, and the descriptions thereof are omitted.

The optical disk apparatus in this example includes, in addition to the components of the optical disk apparatus in the first example, a RAM 119 for storing data of a defective sector, and a RAM 120 for temporarily storing reproduced data. The RAM 119 is connected to the error correction circuit 110. The RAM 120 is connected to the sector format controller 108.

The structure of the optical head portion and the format of the optical disk are the same as those in the first example.

First, the recording operation in this example is described. For simplicity, for example, it is assumed that the recording is performed for total of 40 sectors, i.e., the 1st to 20th sectors for each side, one continuous recording is performed for each set of ten sectors, and the defective sectors are the 3rd sector, the 5th sector, and the 15th sector on the side-A.

In the recording operation, an error correction code is first attached to the data for twenty sectors. The data with the error correction code are stored in the RAM 109, and also transmitted to the sector format controller 108. The sector format controller 108 converts the data into signals suitable to be recorded on a disk, and distributes the data into data of ten sectors for side-A and side-B, respectively. The distributed data are recorded onto the side-A and the side-B by the laser power control circuits (A) 104 and (B) 105, respectively. When the recording of data for ten sectors is completed, the recorded data are then read out. The read-out data is subjected to an error correction by the error correction circuit 110, and the data after the error correction are checked as to whether they match the data which have been stored in the RAM 109. For example, in the case where the data of the 3rd sector and the 5th sector of the side-A are not matched, the data of the 3rd sector and the 5th sector of the side-A, and also the data of the 3rd sector and the 5th sector of the side-B which are properly recorded are stored into the RAM 119.

Next, the recording of data of ten sectors is performed for the 11th sector to the 20th sector of each of the side-A and the side-B of the optical disk 101. The RAM 109 is cleared, and the new data to be recorded are stored into the RAM 109. The data are recorded into the 11th sector to the 20th sector on the side-A and the side-B of the optical disk 101, respectively, in the same way as described above. When the recording is completed, the recorded data are read out. The read-out data are checked as to whether they match the data which have been stored in the RAM 109. If the data of the 15th sector of the side-A is not matched, the data of the 15th sector of the side-A and also the data of the 15th sector of the side-B are stored in the RAM 119.

Then, data of the defective sectors which are stored in the RAM 119 are alternatively recorded into alternative sectors in the spare area of the optical disk 101. For example, the data to be recorded into the 3rd, 5th, and 15th sectors of the side-A and the data to be recorded into the 3rd, 5th, and 15th sectors of the side-B are recorded into the (q)th, (q+1)th, and (q+2)th sectors of side-A and the (q)th, (q+1)th, and (q+2)th sectors of side-B, respectively. In this case, the check of the recorded data as to the matching is also performed. If the recorded data match the readout data, the recording operation of data is terminated.

In the final step, the information relating to the alternative recording (defect information) is recorded in the map area. As is shown in FIG. 3, the map areas are located at the same position on side-A and side-B. The user data are subjected to the same alternative recording process for both the side-A and the side-B, so that the defect information recorded in the map area for side-A is identical with that for side-B. In this example, unlike the conventional case, it is unnecessary to record the same data into a plurality of areas on each side. In the conventional apparatus, the defect information for side-A is different from that for side-B, so that it is necessary to record the same data into a plurality of areas in order to protect the data recorded in the map area.

On the contrary, according to the invention, the information is identical for the side-A and the side-B. This is effective in cases where the data in the map area of the side-A is broken, because the data in the map area of the side-B can be used. That is, one recording operation can attain the same effects as those obtained by the multiple recording. Accordingly, it is possible to shorten the time required for recording the defect information into the map area, and the map area in each side can be reduced. This allows the data area to be effectively used. When the recording of the information relating to the substituting process into the map area is completed, all the recording operation is terminated.

Next, the reproducing operation is described. In the reproducing operation, the information in the map area is first read out, so as to recognize the defect information, i.e., the address of the defective sector and the address of the alternative sector. Then, the data of the 1st sector to the 20th sector on the side-A and the side-B are read out. The read-out data are first stored in the RAM 120. Then, the data of the (q)th, (q+1)th, and (q+2)th sectors on the side-A and the side-B are read out. The sector format controller 108 rearranges the reproduced data stored in the RAM 120 and the reproduced data read out from the alternative sectors on the basis of the defect information read out from the map area, so as to produce a series of data. The series of data is transmitted to the error correction circuit 110, and in turn transmitted to the host computer via the drive controller 112.

As described above, according to the reproducing method in this example, the data in the data area and the data in the alternative area are read out at one time, so that the number of the retrieval operations is reduced even in the reproduction of data which include a large amount of data alternatively recorded. Thus, the reproducing process speed is made higher. Such a reproducing method can be applied in cases where a certain amount of data is not recorded at one time, unlike this example.

EXAMPLE 3

Figure 6:
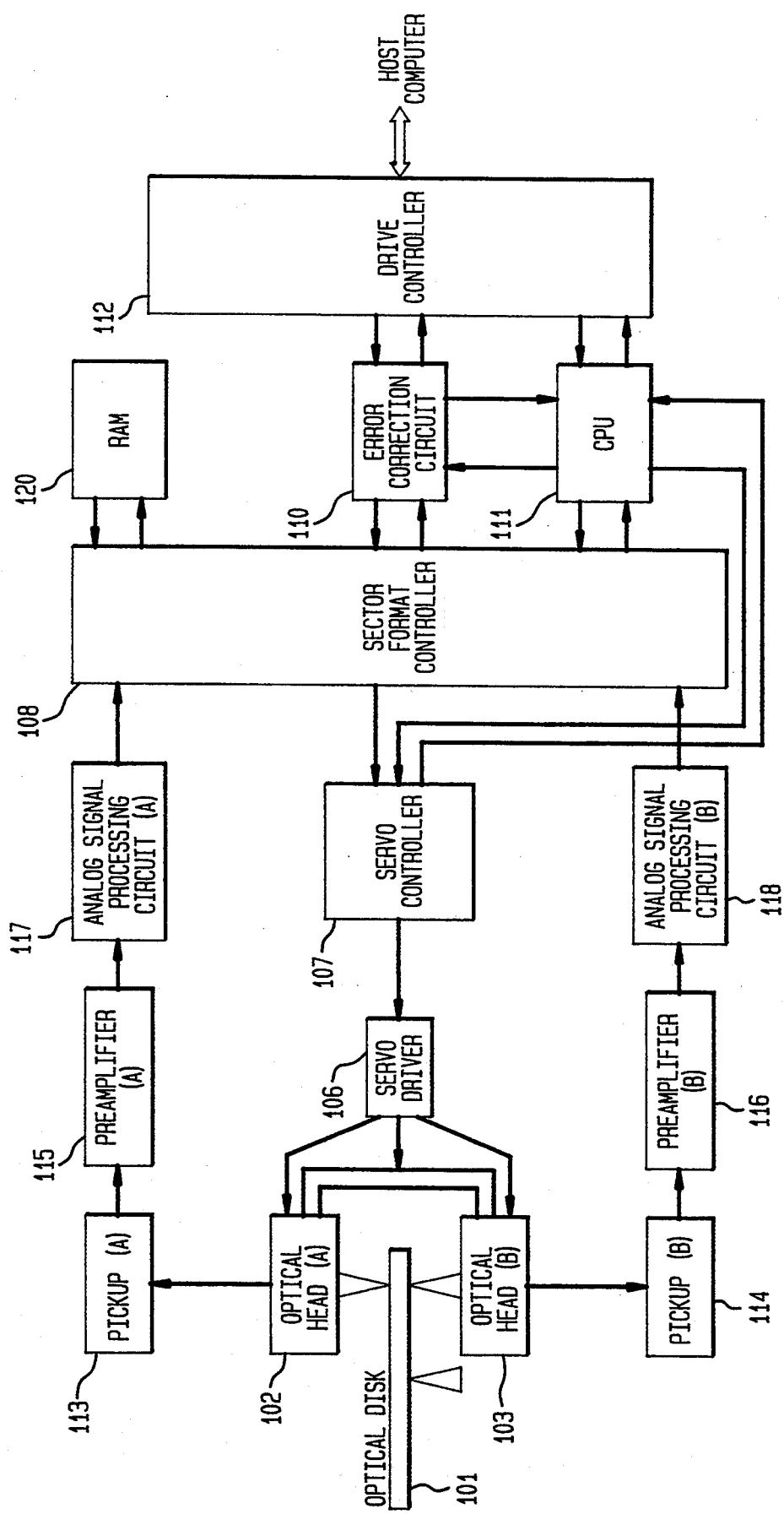
FIG. 6 is a block diagram showing a reproduction system of a circuit configuration of an optical disk apparatus in Example 3.

A process and a construction of a reproduction system of an optical disk apparatus in a third example of the invention will be described with reference to FIG. 6. FIG. 6 is a block diagram showing the construction of the reproduction system of the optical disk apparatus in this example. In FIG. 6, identical components to those of the optical disk apparatus in the first example shown in FIG. 1 are indicated by identical reference numerals, and the descriptions thereof are omitted.

The reproducing operation in the optical disk apparatus in this example is described below.

The reproducing process for the optical disk 101 is started from the reading of information relating to the alternative recording (defect information) in the map area. When the information in the map area is read out, the CPU 111 detects the amount of data alternatively recorded. Depending on the detected amount, the CPU 111 selects one of the two reproducing methods: the reproducing method in the first example, and the reproducing method in the second example.

In the reproducing method in the first example of this invention, the process in the sector format controller 108 is a simple process in which the data of the side-A and the data of the side-B are alternately arranged for sectors. However, the alternative sector is retrieved for each defective sector, so that the reproducing process time may increase due to the retrieval process in such a case where the amount of data alternatively recorded is large.

In the reproducing method in the second example of the invention, the data of the alternative sectors are read out at one time, so that it is sufficient to perform the retrieval operation only once or at most a few times. This results in the reduction of the retrieval time. However, the process in the sector format controller 108 is a complicated process in which the data in the normal data area and the data of the alternative sectors are rearranged, and then the data of the side-A and the data of the side-B are alternately arranged for sectors. Therefore, if the amount of data alternatively recorded is small, the reproducing process time in the sector format controller 108 is increased.

Figure 7:
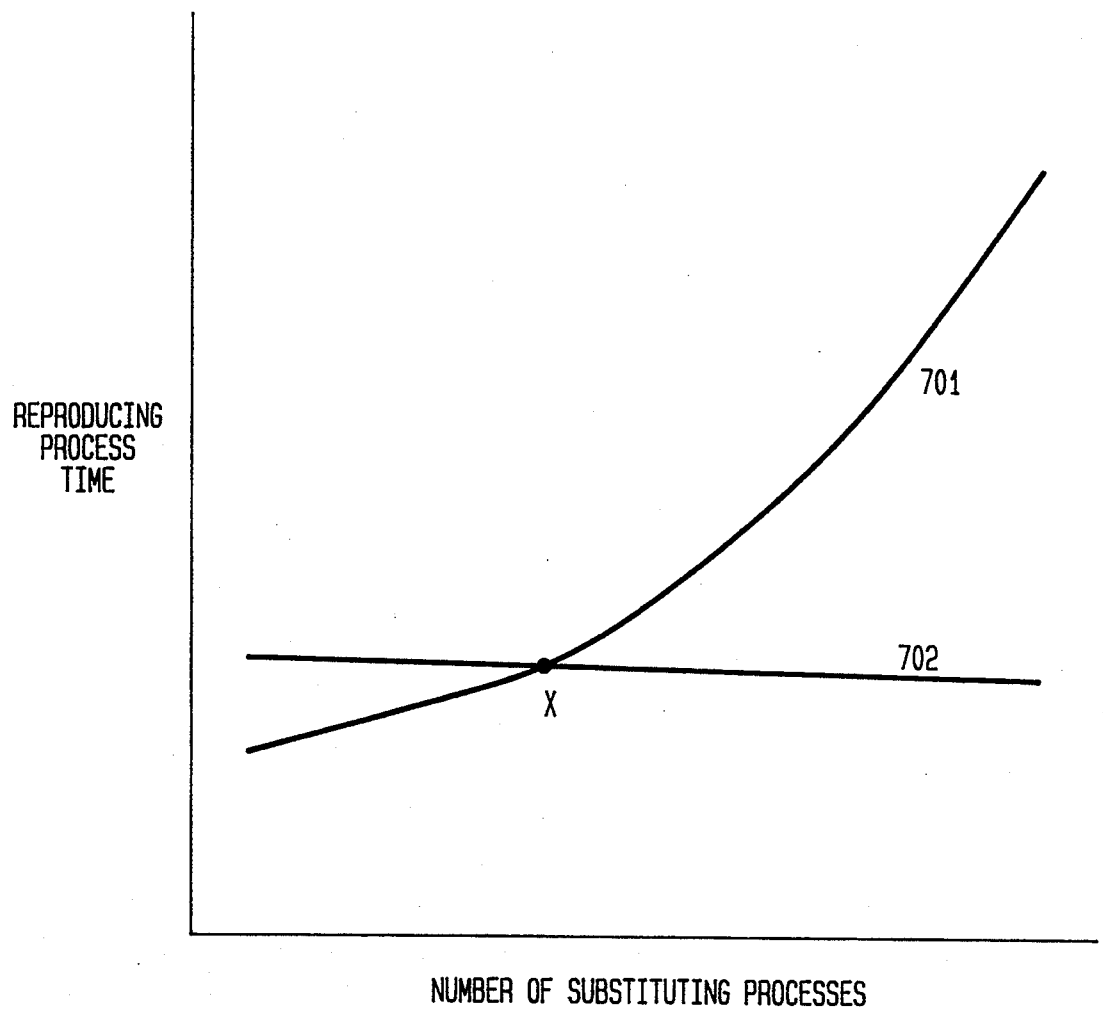
FIG. 7 is a graph showing the relationship between the number of substituting processes and the reproducing process time in the optical disk apparatus.

FIG. 7 illustrates the relationship between the number of substituting processes and the reproducing process time by the reproducing method in each of the first example and the second example. In FIG. 7, the line 701 indicates the relationship between the number of substituting processes and the reproducing process time by the reproducing method in the first example. The line 702 indicates the relationship between the number of substituting processes and the reproducing process time by the reproducing method in the second example. Herein, it is assumed that the number of sectors from which data are to be read out is the same for both of the reproducing methods. In FIG. 7, a symbol "x" represents the number of substituting processes at the intersection of the line 701 and the line 702.

In this example, the CPU 111 recognizes the number of the substituting processes from the alternative information (defect information) in the map area. The CPU 111 instructs the servo controller 107 and the sector format controller 108 to implement the reproducing method in the first example when the number of the substituting processes is equal to or smaller than (or smaller than) the value x, and to implement the reproducing method in the second example when the number of the substituting processes is larger than (or equal to or larger than) the value x. In this way, the CPU 111 selects the reproducing method to be employed.

If the value x is previously stored, for example, in a ROM (not shown) to which the CPU 111 accesses, the CPU 111 can easily recognize the value x.

The value x varies depending on the location of the spare area on the optical disk 101. This is because the time required for one substituting process varies depending on the location of the spare area, so that the relationship between the number of substituting processes and the reproducing process time is changed in each reproducing method. Therefore, by providing a table capable of changing the value x depending on the location of the spare area on the optical disk 101, the reproducing process time can be further shortened. Such a table is also previously stored in the ROM or the like to which the CPU 111 accesses.

By switching the sector reading order and the data process method in the reproducing of data depending on the number of substituting processes, as described above, an optical disk apparatus capable of double-side simultaneous reproducing at a higher speed can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus for an optical disk having two sides for which data can be simultaneously recorded, and each of the two sides includes a spare area for alternative recording, the optical disk apparatus comprising:

means for distributing a series of data to be recorded, into first data to be recorded on a first side and second data to be recorded on a second side;

first recording/reproducing means for recording and reproducing the first data onto and from the first side;

second recording/reproducing means for recording and reproducing the second data onto and from the second side;

detecting means for detecting any defective sector into which data cannot be recorded which occurs in either one or both of the two sides during the simultaneous recording for the two sides;

control means for controlling the first recording/reproducing means and the second recording/reproducing means so as to perform an alternative recording process of alternatively recording data to be recorded into the detected defective sector in one of the two sides, and data to be recorded into a sector in the other one of the two sides corresponding to the defective sector, into alternative sectors in the spare areas of the two sides, respectively, at one time and so as to record defect information relating to the defective sector into a predetermined area of the optical disk; and data integrating means for integrating the first data reproduced by the first recording/reproducing means with the second data reproduced by the second recording/reproducing means simultaneously with the first data, and rearranging the first and second data, thereby producing the series of data.

2. An optical disk apparatus according to claim 1, wherein, each time when the detecting means detects a defective sector, the control means performs the alternative recording process for the defective sector and the corresponding sector which corresponds to the defective sector.

3. An optical disk apparatus according to claim 1, wherein the control means includes first storing means for temporarily storing data to be recorded into the defective sector in one of the two sides which occurs during the recording of the series of data, and data to be recorded into a corresponding sector in the other one of the two sides which corresponds to the defective sector, and wherein the control means controls to perform the alternative recording process to the data stored in the first storing means for a unit of the series of data at one time.

4. An optical disk apparatus according to claim 1, wherein the data integrating means sequentially integrates and rearrange the reproduced first data and the reproduced second data.

5. An optical disk apparatus according to claim 1, wherein the data integrating means includes second storing means for temporarily storing part of data read out from the optical disk, and wherein the data integrating means integrates and rearranges the data stored in the second storing means and the other part of the data read out from the optical disk which is not stored in the second storing means.

6. An optical disk apparatus according to claim 1, further including means for cooperatively moving the first recording/reproducing means and the second recording/reproducing means with respect to the optical disk.

7. An optical disk apparatus according to claim 6, further including means for performing a focusing control and a tracking control independently to each of the two sides of the optical disk.

8. An optical disk apparatus according to claim 1, wherein the control means controls to record the defect information at the same positions for both of the two sides, in a direction along the radius of the optical disk and in a direction along the tangent line of the optical disk.

9. An optical disk apparatus according to claim 1, wherein the detecting means includes third storing means for temporarily storing data to be recorded onto the optical disk, and wherein the recorded data is reproduced from the optical disk, and the defective sector is detected by comparing the reproduced data and the data stored in the third storing means.

10. A method for performing a defect management of an optical disk when a series of data is to be recorded and reproduced, the optical disk having two sides for which data can be simultaneously recorded, each of the two sides including a spare area for alternative recording, wherein a recording step includes the steps of:

distributing a series of data to be recorded, into first data to be recorded on a first side and second data to be recorded on a second side;

simultaneously recording the first data onto the first side, and the second data onto the second side;

detecting any defective sector into which data cannot be recorded which occurs in either one or both of the two sides during the simultaneous recording for the two sides;

performing an alternative recording process of alternatively recording data to be recorded into the detected defective sector in one of the two sides, and data to be recorded into a sector in the other one of the two sides corresponding to the defective sector, into alternative sectors in the spare areas of the two sides, respectively, at one time; and recording defect information relating to the defective sector into a predetermined area of the optical disk; and wherein a reproducing step includes the steps of:

reproducing the first data from the first side, and the second data from the second side;

accessing the alternative sectors of the two sides at one time and reproducing the alternative sector of the first side simultaneously with the alternative sector of the second side; and integrating and rearranging the reproduced first data and the reproduced second data, thereby producing the series of data.

11. An optical disk apparatus for an optical disk having two sides for which data can be simultaneously recorded, and each of the two sides includes a spare area for alternative recording, the optical disk apparatus comprising:

means for distributing a series of data to be recorded, into first data to be recorded on a first side and second data to be recorded on a second side;

first recording/reproducing means for recording and reproducing the first data onto and from the first side;

second recording/reproducing means for recording and reproducing the second data onto and from the second side;

detecting means for detecting any defective sector into which data cannot be recorded which occurs in either one or both of the two sides during the simultaneous recording for the two sides;

control means for controlling the first recording/reproducing means and the second recording/reproducing means so as to perform an alternative recording process of alternatively recording data to be recorded into the detected defective sector in one of the two sides, and data to be recorded into a sector in the other one of the two sides corresponding to the defective sector, into alternative sectors in the spare areas of the two sides, respectively, at one time and so as to record defect information relating to the defective sector into a predetermined area of the optical disk; and data integrating means for integrating the first data reproduced by the first recording/reproducing means with the second data reproduced by the second recording/reproducing means simultaneously with the first data, and rearranging the first and second data, thereby producing the series of data, wherein the data integrating means includes second storing means for temporarily storing part of data read out from the optical disk, and the data integrating means is provided with a first function for sequentially integrating and rearranging the reproduced first data and the reproduced second data, and a second function for integrating and rearranging the data stored in the second storing means and the other part of the data read out from the optical disk which is not stored in the second storing means; and wherein the optical disk apparatus further includes means for detecting an amount of alternative process by reading out the defect information from the predetermined area, and means for switching between the first function and the second function of the data integrating means in accordance with the detected amount of the alternative process.

12. An optical disk apparatus according to claim 11, further including means for cooperatively moving the first recording/reproducing means and the second recording/reproducing means with respect to the optical disk.

13. An optical disk apparatus according to claim 12, further including means for performing a focusing control and a tracking control independently to each of the two sides of the optical disk.

14. An optical disk apparatus according to claim 11, wherein the control means controls to record the defect information at the same positions for both of the two sides, in a direction along the radius of the optical disk and in a direction along the tangent line of the optical disk.

15. An optical disk apparatus according to claim 11, wherein the detecting means includes third storing means for temporarily storing data to be recorded onto the optical disk, and wherein the recorded data is reproduced from the optical disk, and the defective sector is detected by comparing the reproduced data and the data stored in the third storing means.

16. An optical disk apparatus according to claim 1, where said predetermined area comprises a single map area on each side of said optical disk wherein said defect information is recorded, said defect information for both sides being identical with each other, and the map area on one side is a spare map area for the map area on the other side.

17. A method for performing a defect management of an optical disk according to claim 10 wherein said predetermined area comprises a single map area on each side of said optical disk where said defect information is recorded, said defect information for both sides being identical with each other, further comprising step of using the map area on one side as a spare map area for the map area on the other side.

* * * * *